United States Patent [19]

Biava

[11] 4,026,351
[45] May 31, 1977

[54] THERMAL RETENTION FOOD STORAGE CONTAINERS

[76] Inventor: Bruno Biava, 25561 Windjamer Drive, San Juan Capistrano, Calif. 92675

[22] Filed: Aug. 13, 1975

[21] Appl. No.: 604,168

[52] U.S. Cl. ................................. 165/58; 165/75; 62/371; 206/503; 312/236
[51] Int. Cl.² .......................................... F25B 29/00
[58] Field of Search .................. 165/48, 58, 75, 78, 165/80; 62/252, 254, 371, 382, 441; 206/503, 515; 312/236, 308, 138 A

[56] References Cited

UNITED STATES PATENTS

| | | | |
|---|---|---|---|
| 2,928,262 | 3/1960 | Litman | 62/382 X |
| 2,944,410 | 7/1960 | Mann et al. | 312/138 A UX |
| 2,968,933 | 1/1961 | Pfeifer et al. | 62/457 X |
| 3,042,384 | 7/1962 | Bauman | 165/75 X |
| 3,199,579 | 8/1965 | Foster et al. | 165/78 X |
| 3,205,033 | 9/1965 | Stentz | 62/371 X |

FOREIGN PATENTS OR APPLICATIONS

| | | | |
|---|---|---|---|
| 391,019 | 6/1908 | France | 165/75 |

Primary Examiner—Edgar W. Geoghegan
Attorney, Agent, or Firm—Fraser and Bogucki

[57] ABSTRACT

A transportable food catering storage container comprises an insulating rectangular box having a latching hinged door, a rear base parallel to and opposite the door, a bottom or side base panel and an uppermost top or side panel parallel to and spaced apart from the bottom or side base panel, both adjacent and normal to the door. Rectangular narrow profile liquid fillable thermal storage receptacles capable of acting as heat or refrigeration sources are disposed in the box interior adjacent opposite sidewall surfaces. Each thermal storage receptacle has a plurality of longitudinal shelf supports disposed parallel to the side base. Peripheral lips of food containing trays rest on the shelf supports and maintain the receptacles in spaced apart relationship adjacent the box sidewall surfaces. The side base panel exterior has a pair of transversely disposed spaced apart elongated receptacles. A pair of elongated stacking rails, transversely spaced apart on the uppermost side panel, mate with the rectangular receptacles so that similar additional food storage units may be stacked upon one another.

14 Claims, 7 Drawing Figures

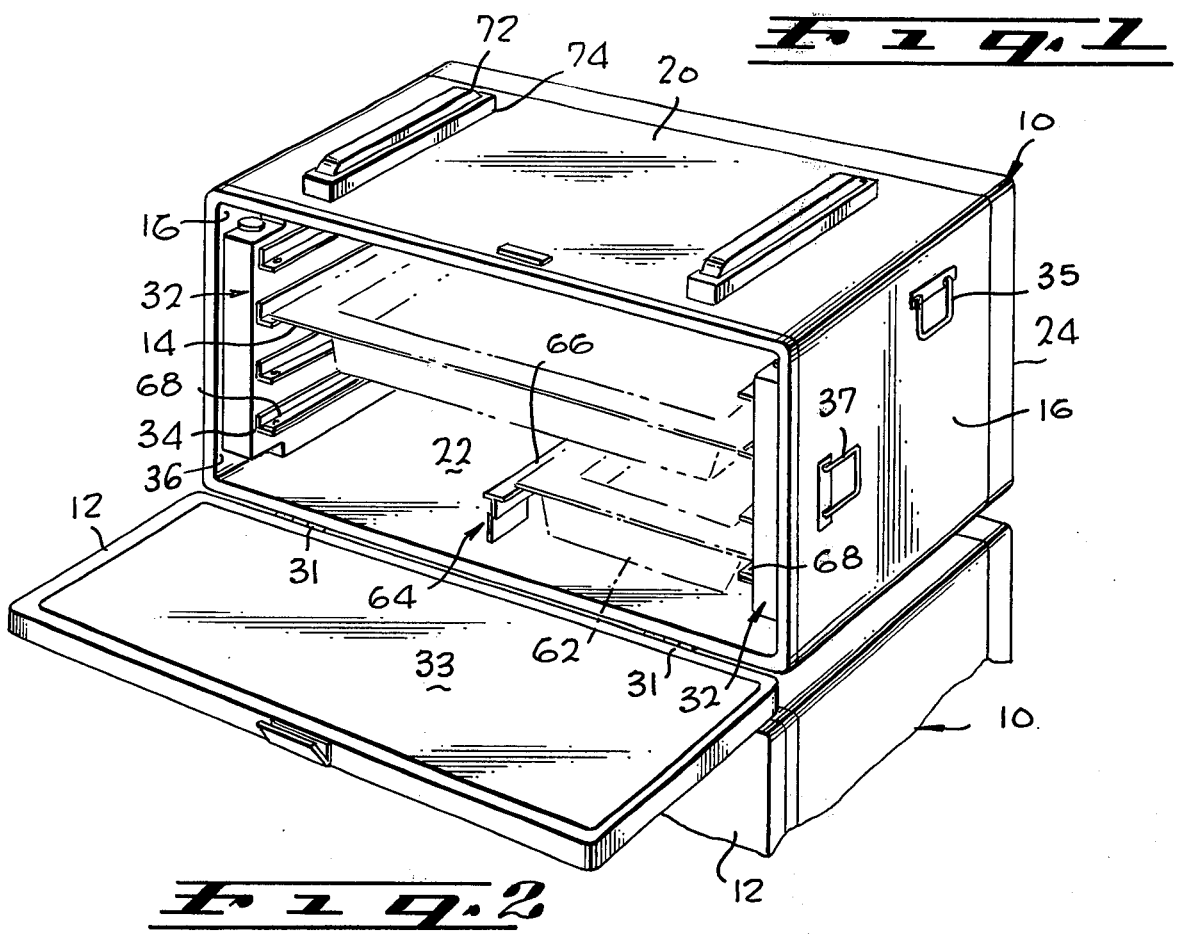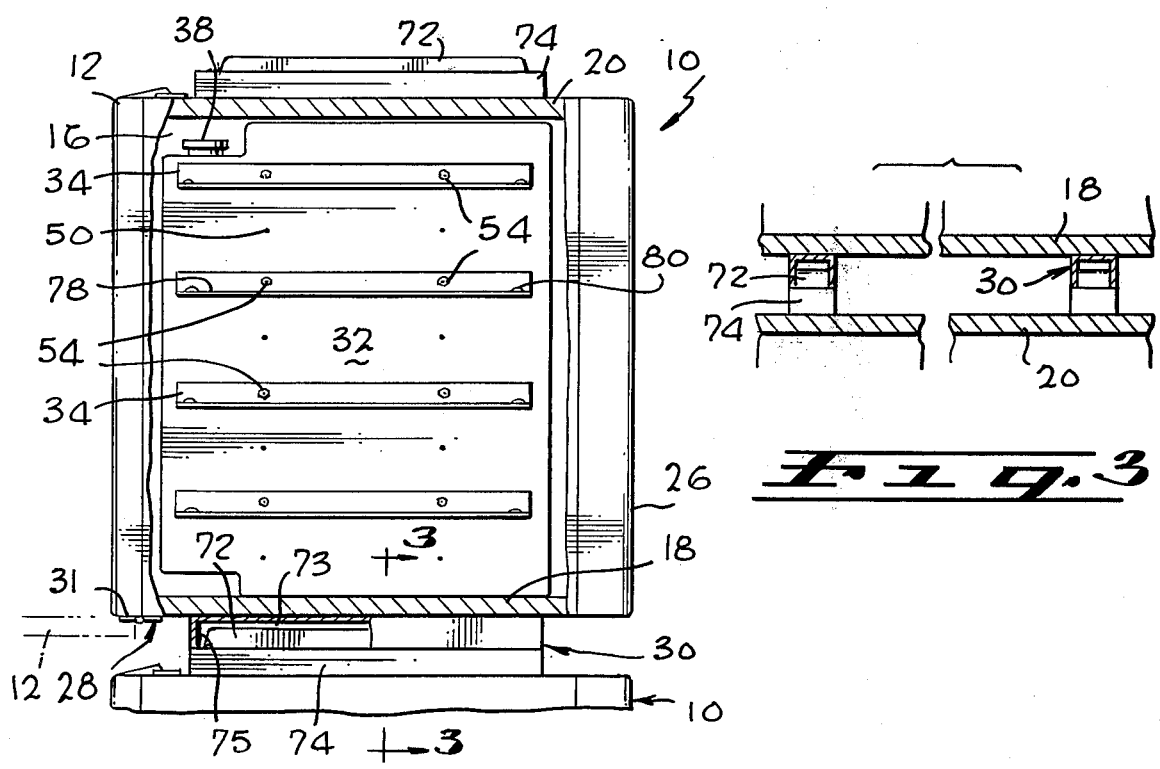

THERMAL RETENTION FOOD STORAGE CONTAINERS

BACKGROUND OF THE INVENTION

1. Field of the Invention

This invention pertains to devices for maintaining foods at temperatures within wide ranges above and below ambient conditions for moderately extended periods of time. Particularly, this invention relates to catering food storage containers.

2. Description of the Prior Art

Food catering services prepare, deliver and serve food for banquets, parties, meetings and similar gatherings of people. This requires catering services to prepare food at locations remote from where the food is to be served, to transport the food as in a truck, to remove the food from the truck, and to set up the food at the desired location for service. The time between preparation of the food and service of that food, or even the removal from the preparation area to delivery to the place of service generally extends over a moderately lengthy period of time, such as several hours. Typically, during or after preparation the food is put into standard sized trays, in which the food is transported and from which it is dispensed.

Both health regulations and palatable considerations require that food be transported and served at proper temperatures. Either the food must be heated or cooled just prior to service, or it must be transported in some way so as to maintain it at a suitable temperature level. In the past, food has been transported in large, tall and bulky units which have been commonly called transit trays. Typically, a transit tray is a stainless steel cart heated electrically, or by canned fuel heating units. Transit trays have presented several difficulties. The bulky nature of this type of food handler usually requires that at least four persons be present to load or unload them from a catering truck. The transit trays are often unsightly and usually must be kept remote from food service locations, particularly during banquets. This necessitates the inconvenience of having to remove individual trays from the transit tray system at remote locations prior to service or utilize an additional service cart.

Space and compactness often become a problem in the transportation of food to a service location. Cleaning up food, plates and utensils after a catering service has been performed must also be dealt with by the catering service personnel.

SUMMARY OF THE INVENTION

A readily maneuvered, versatile container is provided for the storage of food for moderately extended periods of time at temperatures ranging from above to below ambient conditions. The container comprises an insulated box having an interior region, and including an accessible door, a rear base opposite the door, and a bottom or side base adjacent the door. Although the box may be top loaded, the box also comprises means disposed within the interior region of the box for supporting a plurality of stacked shelves or trays in a horizontal position when the bottom or side base is disposed generally horizontally. The door may then be opened to permit lateral access to the box, for horizontal transfer of the food trays to and from the box. The interior volume is also usable when the rear base is disposed in a generally horizontal plane, as when empty food trays are to be returned after use, or bulk items are to be transported.

In a specific example of applicant's invention, liquid fillable, thermal storage receptacles or tanks having a narrow profile are disposed within the interior of the box adjacent opposing sidewalls. Each of the tanks comprise shelf supports which are horizontally disposed and in facing relationship when the box is on the side base. Food trays are then horizontally inserted within the box between the tanks and supported by the shelf supports.

Particular features disclosed in accordance with this invention include spaced apart, transversely disposed rectangular receptacles and transversely disposed, spaced apart elongated stacking rails mateable with the receptacles, the receptacles being disposed on the side base of the box, and the rails being disposed on the uppermost side panel of the box to provide for compatible stacking of similar insulated boxes beneath and above the container. A tray supporting brace for supporting trays having a length substantially less than the distance between shelf supports comprises a tray lip support member disposed between the sidewalls and bearing on the side base. In other examples, sets of handles disposed normal to the door permit lifting of the insulated box in a direction normal to the shelf supports.

BRIEF DESCRIPTION OF THE DRAWINGS

A better understanding of the invention may be had by reference to the following description taken in conjunction with the accompanying drawings, in which:

FIG. 1 is a perspective view of a food storage container in accordance with this invention disposed on its side base and in an open position and stacked upon another food storage container in accordance with this invention;

FIG. 2 is an end plan view with portions removed of the food storage container depicted in FIG. 1;

FIG. 3 is a portion of an end cross-section view taken along the lines 3—3 of FIG. 2;

DETAILED DESCRIPTION

Figure 4:
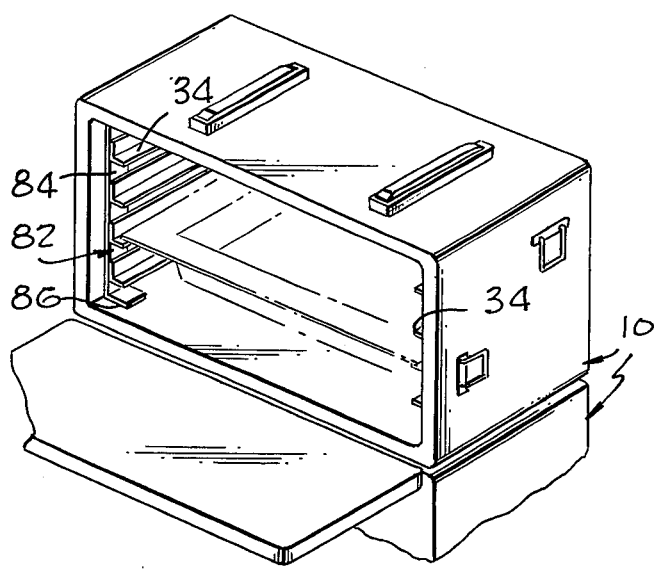
FIG. 4 is a perspective view of a different food storage container in accordance with this invention.

With reference particularly to FIGS. 1 and 2, a food storage container in accordance with this invention generally comprises a transportable insulated box 10 of generally rectangular configuration having a door 12 pivotally attached thereto. The door 2 is movable from a closed position sealing the box 10 from the surrounding environment as in FIG. 2 to an open position as in FIG. 1, the closed defining an upright plane including the food. Removale trays 14 are disposed in the box 10 horizontally and normal to the door 12 when the door is in a closed upright position.

The box comprises a pair of facing, spaced apart upright side panels 16. A lateral bottom or side base panel 8 and a lateral top or uppermost side panel 20 are in parallel facing relationship and normal to the upright side panels 16 to define a rectangular interior food storage region 22. An upright rear panel 24 bounds the interior food region 22. The rear panel 24 has a surface on the box exterior providing a rear base 26. A side base 28 includes the size base panel 18 and is adjacent and normal to the rear base 26 and adjacent to and normal to the door 12 providing support for the box 10. It should be recognized that the word panel as used herein is defined to indicate a portion of the box structure which is generally of planar configuration which may be solid, filled or hollow and usually continuously merges to normally disposed adjacent panels.

The insulated box typically comprises a peripheral metal outer shell and an interior, plastic shell. The metal is joined to the plastic along edges, however the remaining space between the plastic interior and the metal is either hollow, solid plastic or filled with an insulating material such as fiberglass or expanded synthetic resinous material. This provides a substantial insulation between the external ambient conditions and the interior food storage region 22 of the box. The box 10 may simply be similar to 80 quart capacity picnic style food storage chests to provide economical container construction, however the side base and uppermost panels 18, 20 should be disposed generally laterally and the side panels require generally upright construction for efficient space utilization and proper stacking capability. Further, the box should be readily cleanable to satisfy health regulations.

The side base 28 has mounted thereon a pair of elongated rectangular receptacles 30 disposed transversely in spaced apart parallel relationship. The door 12 is pivotally attached to the box 10 at the side base 28 with spaced-apart hinges 31 attached to the container exterior so that the door pivotally opens downwardly when disposed on the side base 28. To allow sufficient access to place and remove trays 14 from the interior food storage region 22 when the side base 28 is disposed on a flat surface, the receptacles 30 have a height more than about the door thickness so that the door may be fully pivoted to a horizontal position. The door 12, when disposed horizontally, provides a food supporting surface 33. The box 10 normally rests on the side base 28 when in use and a first set of handles 35 laterally disposed on the exterior of the container on opposite side panels 16 may be manually grasped for lifting the container vertically. However, the box 10 may be disposed on the rear base 26 and a second set of handles 37 disposed on the exterior of the container on opposite side panels 16 normal to the first set of handles 35 may be grasped for lifting the container.

A pair of matched, rigid, liquid fillable thermal storage receptacles or tanks 32 have a plurality of laterally disposed shelf supports 34 and are removably disposed within the interior region 22 of the box 10. The shelf supports are disposed in pairs on corresponding levels of opposite tanks 32 to support the trays 14 periodically. The tanks 32 have a narrow profile rectangular configuration for efficent space utilization within the box 10. The upright side panels 16 have inner sidewall surfaces 36 against which the tanks 32 are disposed. Sealable screw caps 38 cover a spout by which the bottles may be filled and emptied. When filled with hot water, the tanks 32 act as a heat source within the box 10, tending to raise or maintain the interior temperature of the box, and therefore any food stored within the box, above the ambient conditions external to the box. A preferred material for bottle construction is resinated fiberglass. Though many materials may be used, resinated fiberglass is desirable since it will not deform when filled with hot water and is sufficiently rugged to withstand abuse resulting from frequent movement of trays on the shelf supports 34. It should be noted that while various fillable containers are available for freezing and chilling picnic food storage chests, these are generally of thin gauge thermoplastic material and are not suitable for hot water use nor for withstanding the rugged requirements of the catering trade.

Figure 6:
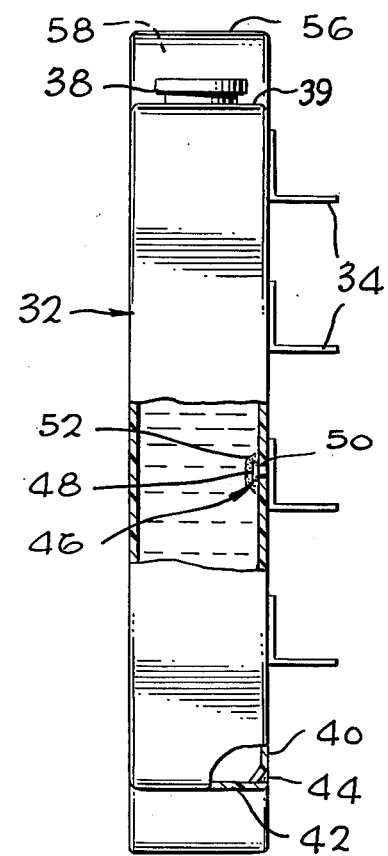
FIG. 6 is a front plan view of a portion of the food storage container of FIG. 1 depicting one of the thermal storage receptacles.

The tanks 32 comprise a rectangular substantially planar element 40 and a regular concave element 42. The substantially planar element 40 mates in concave facing relationship with the concave element 42, the planar element 40 having a slightly reduced perimeter with respect to the concave element 42 so that the planar element 40 may be fitted within the concave element 42. Both the planar element 40 and the concave element 42 have slight outward tapers providing a V-shaped peripheral ridge 44 between corner of the planar element 40 and the edges of the concave element 42. The ridge 44 is filled with a polyester resin sealing the container. The resin used for sealing has the same thermal coefficient of expansion as the resin used for molding the planar element 40 and the concave element 42 to avoid uneven expansion and contraction when the tanks 32 are filled with hot or cold water. A plurality of lateral rows of spaced apart locking nuts 46 have locking cross pieces 48 embedded in the planar element 40 as indicated most clearly in FIG. 6. The locking nuts 46 are inserted in apertures 50 in the shelf supports 34. A small resin impregnated fiberglass patch 52 covers the locking cross pieces 48 of each locking nut 46 both helping to maintain the locking nuts 46 in position and further seal the aperture 50 from liquid seepage. Screws 54 threaded on the locking nuits 46 fasten the shelf supports 34 to the planar element 40 of the tank 32.

The tanks 32, though referred to as a heat source, can as readily be used to provide a refrigeration source or heat sink. That is, where it is desirable to lower the temperature inside the box with respect to ambient conditions, the tanks 32 may be filled with cold water and will absorb thermal energy within the box 10. Each tank 32 has an elongated uppermost surface 56 and the sealable screw cap 38 is disposed beneath the elongated uppermost surface 56 to provide screw cap clearance in the box. This also provides an air margin 58 to limit the amount of liquid which may be added to the tank 32. When subjected to freezing temperatures, the expansion stresses of the liquid transversely upon the bottle are partially relieved by the air margin 58.

The tanks 32 have an elongated base 60, narrow yet sufficiently wide for the tanks 32 to be self supporting. The rectangular configuration defines a height between the base 60 and the uppermost surface 56, and a width measured parallel to the shelf support 34. An inner height of the box 10, between the side base panel 18 and the uppermost side panel 20 is slightly greater than the tank height. The box depth, between the door 12 and the rear base 26, is slightly greater than the width of the tank. Measurement of the tanks 32 when enclosed in the box 10 with trays 14 disposed on the shelf supports 34 is substantially limited, yet the tanks 32 may be easily slid in and out of the box 10. The tanks 32 also have an end region of reduced height 39 opposite the sealable screw cap 38 to facilitate removal of the tanks from the box 10 and to allow the use of a single mold in the manufacture of tanks 32 for both sides of the box 10.

Not only may the tanks 32 be filled with water, but they also may be filled with a liquid detergent solution. This possibility is particularly convenient for catering services which must clean up the premises and the various plates and utensils following a catering operation. When the service of the meal is complete, the tanks may be removed from the box 10, and the water and detergent in the bottles may be thereafter used for clean up purposes.

Figure 7:
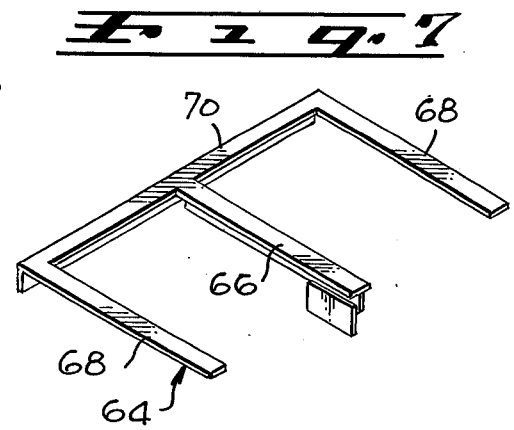
FIG. 7 is a perspective view of a tray support brace in accordance with this invention.
Figure 5:
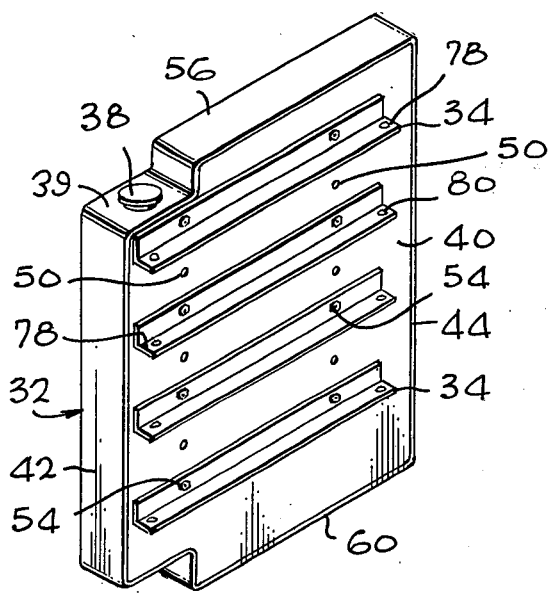
FIG. 5 is a perspective view of one of the thermal storage receptacles depicted in the food storage container of FIG. 1.

Trays 14 for use with the container normally extend substantially the distance between the shelf supports. To allow the use of shorter trays, such as half pins 62, as they are known in the trade, a tray supporting brace 64 is used, as depicted in FIG. 1 and FIG. 7. The brace 64 comprises an elongated tray lip supporting member 66 disposed normal to the upright plane of the door 12 and between the tanks 32 and bearing on the side base panel 18. A pair of elongated brace support members 68 bear on the shelf supports 34 of opposite tanks 32. The brace support members 68 are coupled to the tray lip support member 66 adjacent the rear base panel 26 by an elongated connecting element 70.

A pair of shallow elongated stacking rails 72 are disposed transversely outside the box 10 in parallel spaced-apart relationship on the uppermost side panel 20 of the box 10. The stacking rails 72 mate with elongated rectangular receptacles such as receptacles 30, on similar containers. Risers 74 raise the rails 72 from the uppermost panel 20 and separate the box 10 from a different container stacked on the rails 72 to allow the door 12 to be opened without interference, particularly from a door on the different containers. The side base panel 18 has a pair of elongated rectangular receptacles 30 transversely disposed in parallel, spaced-apart relationship compatible with the elongated stacking rails 72. The receptacles 30 comprise a pair of facing elongated parallel plates 73 and a pair of facing narrow parallel plates 75 disposed normal to and joining the plates 73. The stacking rails 72 and the rectangular receptacles 30 provide for stacking the insulated boxes 10 upon one another as indicated in FIG. 2 and FIG. 3.

Stacking is particularly convenient in catering operations where large quantities of food are to be used. A reasonably large number of containers may be stacked upon one another providing convenient food access. Yet the containers are individually highly maneuverable, overcoming the requirement of prior art food handling devices which required four people, for example, to transport. In some situations, the food containers may be stacked two high and situated beneath serving tables, such as at a large buffet. This permits the containers to be somewhat removed from view, yet maintained at the point of service. Food need not be stored in a kitchen far from the serving area, as had frequently been required in the past because of the generally unsightliness of transit trays. The doors 12 of the boxes 10 when disposed in stacked relationship may be opened either individually or simultaneously to allow removal of the containers. Longitudingal movement of a stacked pair of insulated boxes 10 with respect to each other is prevented by the rail length bearing on elongated parallel plates 73 of the rectangular receptacles 30. Transverse movement of a pair of insulated boxes 10 with respect to each other is prevented by the width of the rails 72 bearing on the narrow plates 75.

Sometimes it is necessary to carry both hot and cold food to a catered function. A transit tray is limited to carrying either hot or cold foods, but not both. However, separate food storage containers in accordance with this invention may be used to separately carry, for example hot entrees and cold desserts. The heat source tanks 32 of separate containers may be filled with hot or cold water, yet the hot food containers and the cold food containers may be stacked on one another providing convenient access to both, yet with adequate thermal isolation between each container.

Hot trays 14 which are removed from an oven and are placed in the box 10 may be typically 180° F. (82° C.). The tray lips could sear the plastic portion of the rear base panel 26 and the door 12 if allowed to move along the shelf supports 34 within the box 10. The shelf supports 34 have uppermost end portions 78 and raised portions 80 disposed adjacent uppermost end portions to limit tray movement in the box.

FIG. 4 depicts another example of a food storage container in accordance with this invention in which the shelf supports 34 are disposed adjacent the inner sidewall surfaces 36 of the box 10. Vertical uprights 84 are joined to the shelf supports 34 to maintain the shelf supports 34 in spaced apart, laterally disposed relationship while laterally extending feet 86 support the uprights 84.

It should be noted that the insulated box may have different configurations than described above. For example, the shelf supports 34 may be mounted directly on the facing inner sidewall surfaces 36 to the side panels 16. The insulation of the box rather than the heat source tanks 32 may be relied upon, in some situations, to isolate the food storage region from the external ambient temperatures. Further, a thermal storage receptacle without shelf supports 34 may be positioned below the trays 14 in other configurations. The door 12, being shown as hinged to the side base of the box 10 could be hinged at the side so that the door 12 would open laterally rather than vertically. Also, the door 12 could be removably latched to the box 10 such that when in the open position, the door 12 is completely removed from the box 10. Having the door hinged to the side base, however, provides the horizontal food supporting surface 33.

Thus, it is apparent that the invention provides a convenient catering unit providing useful and needed features primarily to the catering trade. While the application has been described in accordance with the accompanying drawings, other variations will be apparent from reading the appended claims in view of the specification.

What is claimed is:

1. A container for storing food for moderately extended periods of time at temperatures differing from the environment external to the container comprising:
   a transportable rectangular insulated box having an interior food storage region, the box comprising a pair of spaced apart upright side panels having facing inner sidewall surfaces, a pair of parallel, facing, spaced apart lateral panels, a side base including one of the lateral panels, a rear base panel, the box being supportable on the side base and on the rear base panel;
   a door, the door and the rear base panel being disposed in spaced-apart relationship generally normal to the spaced apart side walls and normal to the spaced apart lateral panels, the door pivotally coupled to the lateral panel of the side base movable from a closed position including an upright plane passing through the box, to an open position providing lateral access sufficient to transfer food trays to and from the interior food storage region;

a pair of liquid fillable thermal storage tanks removably disposed within the box, for tending to raise and lower the temperature within the food storage region above and below external ambient temperatures, the thermal storage tanks having a narrow base disposed on the side panel of the box, and laterally disposed shelf supports for supporting a plurality of trays within the box in a generally horizontal plane when the box is supported on the side base; and at least one tray disposed within and slidably removable from the food storage region for containing food, the at least one tray being situated between the liquid fillable thermal storage tanks and supported by the shelf supports.

2. The invention as set forth in claim 1, and in which:

the liquid fillable thermal storage tanks have a generally rectangular configuration defining a tank height and width, the box having an interior height measured between the lateral panels slightly greater than the tank height, and an internal width measured between the door and the rear base panel slightly greater than the tank width, each tank being disposed upright, parallel and adjacent to a different side panel, the shelf supports of each tank facing the shelf supports of the other tank; and stacking means coupled to the lateral panels for coupling the box to a different container configured in accordance with a container as specified by this claim to prevent movement of the different container normal to the upright plane.

3. The invention as set forth in claim 1, and in which the liquid fillable heat source tanks comprise a fillable capped opening, the bottle comprising an uppermost surface adjacent the uppermost lateral panel, the capped opening being disposed beneath the upper surface of the tank to limit the quantity of liquid in the tank and thereby diminish transverse stresses on the tank when the tank is filled with a liquid and subjected to freezing temperatures; and the shelf supports comprise a plurality of pairs of laterally disposed elongated brackets of generally L-shaped cross section, each bracket of a pair being fastened to a different one of the pairs of tanks at corresponding levels and generally parallel to the bases of the tanks to support lips of trays disposed on the bracket pair generally horizontally when the box is disposed on the side base.

4. The invention as set forth in claim 3, and in which at least one of the tanks comprises resinated fiberglas, a plurality of rows of locking fasteners having a locking portion embedded in the resinated fiberglass and means for fastening each bracket to a different row of locking fasteners, the bracket having means for inhibiting movement of trays normal to the upright plane.

5. A container for storing food for moderately extended periods of time at temperatures in a wide temperature range differing from external ambient temperatures comprising:

an insulated, rectangular box having an interior food storage region, a movable door disposed along an upright plane when in a closed position sealing the food storage region, a lateral base panel and uppermost lateral panel parallel to the lateral base panel and normal to the upright plane;

means coupled to the box and disposed within the food storage region for supporting a plurality of shelves horizontally when the lateral base panel is disposed in a generally horizontal plane;

first stacking means disposed outside the box on the lateral base panel for receiving mateable stacking means of a first similar container so that the insulated box may be stacked on the first similar container for convenient access and to allow maximal food serving space utilization;

a pair of liquid fillable thermal storage tanks removably disposed within the box, each tank having a plurality of shelf supports, the shelf supports of each tank being disposed in facing and corresponding relationship for supporting trays on the shelf supports between the pair of tanks; and a second stacking means disposed outside the box on the uppermost side panel for receiving mateable stacking means from a second similar container so that the second similar container may be stacked on the insulated box for convenient access and to allow maximal food serving space utilization.

6. The invention as set forth in claim 5, and in which:

the first stacking means comprises an elongated, rectangular receptacle comprising two pairs of spaced apart facing plates, each pair being disposed normal to the other pair; and the second stacking means comprises an elongated rail coupled to the side panel for mating with an elongated, rectangular receptacle of the second similar container disposable on the box, each pair of plates for limiting movement of a shallow elongated rail of the second similar container normal to each pair of plates, thereby limiting relative movement of the box relative to the second similar container therebeneath.

7. A transportable food storage container for storing food for moderately extended periods of time at a wide temperature range differing from temperatures outside the container comprising:

an insulated rectangular box comprising an interior food storage region, a pair of upright side panels having sidewall surfaces in facing spaced-apart relationship, a lateral side base panel and a lateral uppermost panel in spaced-apart relationship disposed normal to the upright panels, a side base including the side base panel, a rear upright base panel normal to the upright side panels;

a door pivotally coupled to the side base panel and disposed normal to the upright side panels and parallel and spaced apart from the rear base panel for enclosing the food storage region, the door movable from a closed position sealing the food storage to an open position, the closed position defining an upright plane including the door;

a pair of liquid fillable thermal storage tanks disposed within the food storage region for altering the temperature of the food storage region with respect to the temperature external to the insulated box when filled with a liquid having a temperature differing from the external environment, the thermal storage tank pair comprising a plurality of corresponding shelf support pairs for supporting trays between the tanks normal to the upright plane and generally horizontally when the box is supported on the side base;

at least one tray having a peripheral lip supported by one of the shelf support pairs; and first stacking means disposed outside the box coupled to the uppermost lateral side panel and second stacking means disposed outside the box coupled to the side base panel for stacking containers of the type configured in accordance with this claim upon and below the box, the first stacking means being mateable with the second stacking means for limiting relative movement of the box in a plane normal to the upright plane of the door with respect to another container stacked above or below the box.

8. The invention as set forth in claim 7, and in which:

the first stacking means comprises a pair of spaced apart, elongated risers transversely disposed outside the box on the uppermost side panel for separating a different container disposable on the first stacking means from the box to allow the door to be opened without interference, and a pair of elongated rails on the risers; and the second stacking means comprises a pair of spaced apart, elongated, rectangular receptacles transversely disposed outside the box on the side base panel and mateable with the rails, the receptacles and rails for limiting movement in mutually perpendicular directions normal to the door of different containers disposed above and below the box.

9. The invention as set forth in claim 7, and in which:

each tank comprises a narrow generally rectangular fiberglass enclosure having an uppermost surface, a cap disposed beneath the uppermost surface for limiting the maximum liquid level in the container and providing an air margin for limiting transverse expansion of a liquid against the tank upon freezing, a plurality of L-shaped brackets disposed so as to lie in a horizontal plane when the insulated box is supported on its side base, and a plurality of fastener elements having a cross piece head embedded in the bottle for fastening the brackets thereto;

the door being pivotably attached on hinges to the side base panel so that the door opens downwardly when the box is supported on its side base, the side base having a sufficient height so that the door may be pivoted to a horizontal position to allow sufficient access to transfer trays to and from the interior food storage region, the door comprising a food supporting surface disposable in a generally horizontal plane when the box is supported on its side base panel; and the box comprising latch means disposed on the door and the uppermost lateral side panel for sealing the door to a closed position, the box further comprising means for manually grasping and lifting the container vertically when the side base is disposed substantially horizontally.

10. The invention as set forth in claim 9 and comprising a tray supporting brace, the tanks when disposed against the sidewall surfaces define a tray accepting length between the brackets of opposite tanks, the brace for supporting trays having a dimension substantially less than the tray accepting length comprising a tray lip supported member disposed between the sidewall surfaces of the box and bearing on the side base panel, a pair of elongated brace support members, each bearing on shelf supports of a different tank and means disposed adjacent the rear base panel coupling the brace support member to the tray lip support member so that trays of reduced dimension having a peripheral lip may be supported by the tray lip support member and by a bracket on one of the tanks.

11. A liquid fillable thermal storage tank for tending to raise and lower the temperature of an insulated food storage container with respect to ambient conditions external to the container, the container being of the type comprising an insulated box having an interior food storage region, a base panel, a door having a closed position normal to the base panel and a pair of spaced apart facing side panels normal to the door and the base panel, the tank comprising:

a rigid generally narrow profile rectangular configuration liquid retainable tank capable of holding hot water without material deformation, the tank having a lateral base surface and a pair of facing upright generally rectangular surfaces; and a plurality of shelf supports coupled to one of the generally rectangular surfaces of the liquid retainable tanks which provide support to a plurality of shelves generally parallel to the base surface when the tanks are disposed within an insulated food storage container of the aforementioned type, are supported on the base panel, bear on the side panels on the box and the shelf supports face a food storage region of the box.

12. The invention as set forth in claim 11 and in which:

each shelf support comprises an elongated bracket of L-shaped cross section having an upright portion fastened to the tank and a laterally extending tray lip support portion; and the tank comprising an uppermost surface and a removably capped opening disposed beneath the uppermost surface to provide an air margin upon filling to minimize transverse expansion of the tank upon freezing of a liquid therein.

13. The invention as set forth in claim 12 and comprising a plurality of laterally disposed rows of fasteners embedded in the tank for adjustably fastening the shelf supports thereto.

14. The invention as set forth in claim 3 and in which the laterally extended portions have uppermost end portions and raised portions disposed adjacent the uppermost end portions to limit lateral tray movement when the trays are disposed on the shelf supports within the insulated box.

* * * * *

UNITED STATES PATENT AND TRADEMARK OFFICE
CERTIFICATE OF CORRECTION

PATENT NO. : 4,026,351
DATED : May 31, 1977
INVENTOR(S) : Bruno Biava

It is certified that error appears in the above-identified patent and that said Letters Patent are hereby corrected as shown below:

In the Abstract, line 14, "spaced apart" should read --spaced-apart--. Column 2, line 58, after "door" and before "is", "2" should read --12--; line 61, after "closed" and before "defining" insert --position--; line 62, "Removale" should read --Removable--; line 65, after "box" and before "comprises" insert --10--; line 67, after "panel", "8" should read --18--. Column 3, lines 57 & 58, "periodically" should read --horizontally--. Column 4, line 6, after "various" and before "fillable" insert --liquid--; line 36, after "locking" and before "46", "nuits" should read --nuts--; line 62, after "the" (first occurrence) and before the period ("."), "tank" should read --bottle--. Column 5, line 62, after "the" and before the period (".") "containers" should read --contents--. Column 7, line 13, after "side" and before "panel", insert --base--. Column 8, line 58, after "storage" and before "to" insert --region--. Column 10, line 7, "supported" should read --support--.

Signed and Sealed this thirtieth Day of August 1977

[SEAL]

Attest:

RUTH C. MASON
Attesting Officer

C. MARSHALL DANN
Commissioner of Patents and Trademark